Patented Nov. 19, 1940

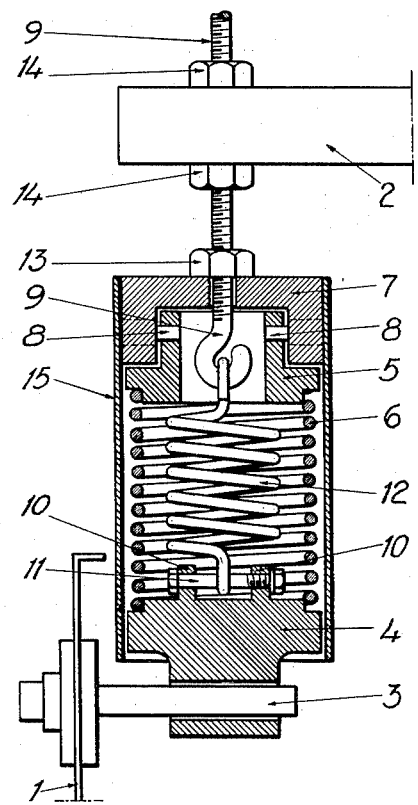

2,222,146

UNITED STATES PATENT OFFICE 2,222,146

VIBRATION APPARATUS

Nils Walfrid Jönsson, Obbola, Sweden

Application May 10, 1937, Serial No. 141,791
In Sweden January 18, 1936

4 Claims. (Cl. 267—1)

The invention relates to a device for suspending vibrated machines, particularly vibration screens for cellulose and the like, in which the vibrated member at each one of two or more points is suspended in a stationary frame by two elastically yielding elements, for instance, coil springs, at least one of said yielding elements acting as a compression spring. The object of the invention is to obtain a greater liberty of movement for the vibrated machine and avoid too great a stress, particularly bending stress, on the elastically yielding elements. This is obtained according to the invention, in that each of the elastically yielding elements at one end acts against a supporting member not taking part in the vibrations and at least one of them is in turnable or rotatable connection with the stationary frame, while the other end of each element is connected with the vibrated part by means of a member which is turnably or rotatably mounted thereon. In an embodiment, which is preferred in view of its compact construction, with one coil spring acting as a tension spring and with one coil spring acting as a compression spring at the same point of suspension, one of the two springs is located within the other. Preferably, the tension spring is provided within the compression spring and is rotatably suspended in its supporting member which is connected with the stationary frame. The compression spring cooperates with a special supporting member which is rotatable with respect to the first mentioned supporting member.

Suspension devices for vibrated machines are known, in which the vibrated part is suspended in a stationary frame at one point by two elastically yielding elements, at least one of said elements acting as a compression spring. No measures have been taken in these known devices to protect the springs against lateral deformation so that an additional stress arises whereby the life of the springs is reduced. By the fact that in the device according to the invention, the tension spring as well as the compression spring is rotatably supported at one end against the stationary frame by insertion of links the two springs can work without or with only a slight lateral deformation.

The drawing shows a device according to the invention in upright projection, partly in section.

The pin 3, which is rigidly connected with the vibrating part 1, is rotatably mounted in a member 4 which is formed as a spring holder. Between the said member 4 and an annular supporting member 5 is provided a coil spring 6 acting as a compression spring. An annular holder 7 is provided around the upper part of the supporting member 5. The supporting member 5 is provided with two diametrically extending bores, into which project pins 8 screwed into the holder 7 and around which the supporting member 5 rotates. In the middle of the holder 7 there is a hole through which the hook 9 freely extends. Between the hook 9 and a bolt 11 located in ears 10 of the member 4 there is fixed a coil spring 12 acting as a tension spring. Thus, the tension spring 12 is provided within the compression spring 6. The hook 9 is connected by nuts 14 with a member 2 connected with the frame. The position of the pin 3 may be adjusted by these nuts 14. The tension of the springs 12 and 6 may be controlled by the nut 13. The springs are contained in a protecting sleeve 15 formed of flexible material. As will be seen, the tension spring 12 is rotatably suspended in its supporting member 9, and the compression spring 6 cooperates with a special supporting member 5, which by pins 8 is rotatably connected with the first-mentioned supporting member 9.

Having now described my invention, what I claim as new and desire to secure by Letters Patent is:

1. In screening apparatus having a screen and means for vibrating the screen, means for yieldably supporting the screen on a stationary frame comprising, an elastically yielding compression element, an elastically yielding tension element, said elements being concentrically arranged, a member oscillatably mounted on the screen, said yielding elements being at one of their adjacent ends in positive engagement with said member, connecting means including a separate oscillatable connection for the other end of each of said elements for connecting said elements to the stationary frame, said elements serving as sole supporting means between said member and said connecting means, whereby said elements are subject only to compression and tension stresses during the vibration of the device in a plane at right angles to the axis of the concentric elements.

2. Supporting means as claimed in claim 1, wherein said elements consist of coiled springs, said compression spring bearing at one end against said oscillatable member and at the other end against said connecting means.

3. Supporting means as claimed in claim 1, wherein said elements consist of coiled springs, the tension spring being disposed concentrically within said compression spring.

4. Supporting means as claimed in claim 1, and further comprising means for adjusting the compression and tension of said elements.

NILS WALFRID JÖNSSON.